(12) United States Patent
Rhim et al.

(10) Patent No.: US 10,245,533 B2
(45) Date of Patent: Apr. 2, 2019

(54) SIMULTANEOUS ACCOMPLISHMENT FOR FILTRATION AND WASHING AT PORE CONTROLLABLE FIBER FILTER

(71) Applicants: Jung-A Rhim, Busan (KR); Yoonjin Environment Co., Inc., Busan (KR); Jin-Gon Yoon, Busan (KR)

(72) Inventors: Jung-A Rhim, Busan (KR); Jin-Gon Yoon, Busan (KR); Jeong-Hyo Yoon, Busan (KR); Je-Sung Ahn, Busan (KR); Jong-Won Kim, Busan (KR); Jang-Gon Im, Busan (KR); Hyen-Woo Kim, Busan (KR); Eun-Joo Shin, Busan (KR); Sang-Hee Kim, Busan (KR); Jeong-Hoon Im, Busan (KR); Eun-Ji Jung, Busan (KR)

(73) Assignees: Jung-A Rhim, Busan (KR); Yoonjin Environment Co., Inc., Busan (KR); Jin-Gon Yoon, Busan (KR)

( * ) Notice: Subject to any disclaimer, the term of this patent is extended or adjusted under 35 U.S.C. 154(b) by 202 days.

(21) Appl. No.: 15/343,214

(22) Filed: Nov. 4, 2016

(65) Prior Publication Data
US 2017/0072342 A1 Mar. 16, 2017

Related U.S. Application Data

(63) Continuation of application No. 14/247,317, filed on Apr. 8, 2014, now abandoned.

(30) Foreign Application Priority Data

Jan. 27, 2014 (KR) ........................ 10-2014-0011662

(51) Int. Cl.
*B01D 33/00* (2006.01)
*C02F 11/12* (2006.01)
(Continued)

(52) U.S. Cl.
CPC ....... *B01D 33/0029* (2013.01); *B01D 33/048* (2013.01); *C02F 11/123* (2013.01);
(Continued)

(58) Field of Classification Search
CPC .. B01D 33/0029; B01D 33/048; B01D 33/72; B01D 33/50; B01D 33/54; B01D 33/11;
(Continued)

(56) References Cited

U.S. PATENT DOCUMENTS 2,101,109 A 12/1937 Thomson
2,247,460 A 7/1947 Wright
(Continued)

*Primary Examiner* — David C Mellon
*Assistant Examiner* — Liam Royce
(74) *Attorney, Agent, or Firm* — Revolution IP, PLLC

(57) ABSTRACT

Disclosed is a pore adjusting filtering apparatus including: a cylinder having a plurality of holes and in which a screw is rotatably installed; an endless track coupled to an outer peripheral surface of the cylinder by a cylinder, an endless track pin, and a support to be rotatable together with the cylinder; a fiber yarn bundle support rod inserted into the endless track to be connected to the endless track; a fiber yarn bundle, one end of which is fitted with and supported by the fiber yarn bundle support rod; a fiber yarn bundle support net for supporting the fiber yarn bundle while being attached to an outer peripheral surface of the fiber yarn bundle; a cleaning separator fixedly installed at an upper outer side of the cylinder; and an ejector installed on an upper outer side of the cylinder.

2 Claims, 3 Drawing Sheets

(51) Int. Cl.
  *B01D 33/048* (2006.01)
  *B01D 33/72* (2006.01)
  *B01D 33/54* (2006.01)
  *B01D 33/50* (2006.01)
  *B01D 33/11* (2006.01)
  *B01D 35/10* (2006.01)
  *C02F 11/123* (2019.01)

(52) U.S. Cl.
  CPC .............. *B01D 33/11* (2013.01); *B01D 33/50* (2013.01); *B01D 33/54* (2013.01); *B01D 33/72* (2013.01); *B01D 35/10* (2013.01); *B01D 2201/186* (2013.01)

(58) Field of Classification Search
  CPC .. B01D 35/10; B01D 2201/186; C02F 11/123
  See application file for complete search history.

(56) References Cited

U.S. PATENT DOCUMENTS

| | | | |
|---|---|---|---|
| 2,450,522 A | 10/1948 | North | |
| 2,963,158 A | 12/1960 | Jung | |
| 3,622,005 A * | 11/1971 | Kurita | B01D 25/127 210/225 |
| 3,897,341 A * | 7/1975 | Ozawa | B01D 33/04 100/118 |
| 4,200,530 A * | 4/1980 | Mechalas | B01D 33/11 210/784 |
| 4,707,260 A * | 11/1987 | Nagayama | B01D 33/04 100/118 |
| 7,718,065 B2 | 5/2010 | Jordan | |
| 2012/0152819 A1* | 6/2012 | Cho | B01D 29/15 210/393 |

\* cited by examiner

SIMULTANEOUS ACCOMPLISHMENT FOR FILTRATION AND WASHING AT PORE CONTROLLABLE FIBER FILTER

CROSS REFERENCE TO PRIOR APPLICATIONS

This application is Continuation of U.S. patent application Ser. No. 14/247,317 filed Apr. 8, 2014, which claims priority to Korean Patent Application No. 10-2014-0011662 filed Jan. 27, 2014, which are all hereby incorporated by reference in their entirety.

BACKGROUND

A filtering apparatus according to the related art resumes a filtering operation after backwashing in a process of sequentially performing filtering and backwashing so that a filtering operation is stopped during a backwashing operation. In particular, in a rainy season, as filtering paper is blocked, backwashing is increasing so that an amount of filtered water is significantly reduced. A pore adjusting filtering apparatus adjusts a pore during a filtering and a backwashing operation to extend a life span of a filter and improve performance of the filter, but when turbid water is introduced, backwashing is frequently generated to reduce an amount of filtered water.

The existing filtering apparatus is configured such that a pore is blocked as filtering time elapses, but since backwashing is performed while the pore is blocked as the pore is a fixed pore, it is difficult to perform a cleaning operation so that an amount of backwashed water is large and an amount of washing water also increases. The apparatus for performing a cleaning operation and a filtering operation at the same time according to the present invention minutely adjusts pores of the fiber yarn bundle and expands the pores during a cleaning operation. The apparatus according to the present invention can apply vibrations to a fiber yarn bundle as a cam rotates to perform a cleaning operation with a small amount of washing water while shaking down particle substances so that an amount of cleaned water is small and cleaning efficiency is high.

According to the present invention, a filtering operation is continued during a cleaning operation so that an amount of filtered water can be maintained and continuous processing can be effectively performed.

SUMMARY

The technical problems of the pore adjusting filtering apparatus performing a filtering operation and a cleaning operation at the same time according to the present invention are as follows.

First, the filtering apparatus according to the related art stops a filtering operation during backwashing, and sequentially performs a filtering operation and a backwashing operation, that is, performs a filtering operation after the backwashing. The apparatus according to the present invention performs a cleaning operation when a fiber yarn bundle is located at an upper portion of a cylinder and performs an operation of filtering contaminants when the cleaned fiber yarn bundle is located at an upper portion of the cylinder by rotating the cylinder, an endless track, and the fiber yarn bundle, such that the filtering operation and the cleaning operation can be performed at the upper and lower portions of the cylinder.

Second, the filtering apparatus according to the related art is a fixed pore whose pore cannot be adjusted during filtering and backwashing. The apparatus according to the present invention minutely adjusts a pore by attaching a fiber yarn bundle support net to a cylinder during a filtering operation and positions the fiber yarn bundle support net on a cleaning separator to expand a pore and vibrating the fiber yarn bundle support net during a cleaning operation Third, the filtering apparatus according to the related art frequently undergoes a backwashing operation to significantly improve an amount of cleaned water and an amount of washed water when particle substances or sludge are present in water or water is turbid and abundant in algae. The apparatus according to the present invention has a fiber yarn bundle connected to a fiber bundle support rod at one side of an endless track and a cam at another side of the endless track such that the fiber yarn bundle suspended on the support rod reciprocates while the support rod reciprocates as the cam rotates so that particle materials suspended on the fiber yarn bundle are shaken down due to vibrations and an amount of washing water can be significantly reduced by a vibrating cleaning operation of cleaning the particle materials with a small amount of washing water ejected from an ejector located at a lower portion of an ejection unit.

The mechanism of the pore adjusting filtering apparatus performing a filtering operation and a cleaning operation at the same time according to the present invention are as follows.

Sludge in wasted water and floating materials are removed by a fiber yarn bundle whose pore is adjusted, in which case a rotating fiber yarn bundle performs a filtering operation when being located at a lower portion of a cylinder and performs a vibrating cleaning operation when being located at an upper portion of the cylinder.

In a mechanism of filtering floating materials (particle materials) in water, wasted water is introduced into a cylinder through an inlet, passes through a plurality of holes formed on an outer peripheral surface of the cylinder, and is filtered by a fiber yarn bundle surrounding the cylinder. The particles filtered by the fiber yarn bundle is cleaned by washing water ejected from an ejector after being shaken down. A screw is installed in the cylinder to feed sludge and particle materials in the water into a storage container to discharge them into a sludge storage container.

In accordance with an aspect of the present invention, there is provided a pore adjusting filtering apparatus including: a cylinder having a plurality of holes and in which a screw is rotatably installed; an endless track coupled to an outer peripheral surface of the cylinder by a cylinder, an endless track pin, and a support to be rotatable together with the cylinder; a fiber yarn bundle support rod inserted into the endless track to be connected to the endless track; a fiber yarn bundle, one end of which is fitted with and supported by the fiber yarn bundle support rod, for filtering contaminants discharged through the holes of the cylinder while being attached to the cylinder when being located at a lower portion of the cylinder and cleaning contaminants after being spaced apart from a surface of the cylinder 6 when being located at an upper portion of the cylinder; a fiber yarn bundle support net for supporting the fiber yarn bundle while being attached to an outer peripheral surface of the fiber yarn bundle; a cleaning separator fixedly installed at an upper outer side of the cylinder, for supporting the fiber yarn bundle support net while spacing the fiber yarn bundle support net apart from the fiber yarn bundle when the fiber yarn bundle is located on an upper side of the cleaning separator; and an ejector installed on an upper outer side of the cylinder, for removing contaminants by ejecting water to the fiber yarn bundle while the fiber yarn bundle and the fiber yarn bundle support net are separated from each other.

The pore adjusting filtering apparatus further includes a vibration unit installed on an upper outer side of the cylinder, for horizontally vibrating the fiber yarn bundle while a cleaning operation is performed by the ejector.

The vibration unit includes: a spring fitted with the fiber yarn bundle support rod, for resiliently supporting the fiber yarn bundle support rod with respect to the endless track; a cam rotatably installed on an upper outer side of the cylinder, for pushing the fiber yarn bundle support rod laterally at a predetermined period while contacting an end of the fiber yarn bundle support rod; and a cam motor for rotating the cam.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
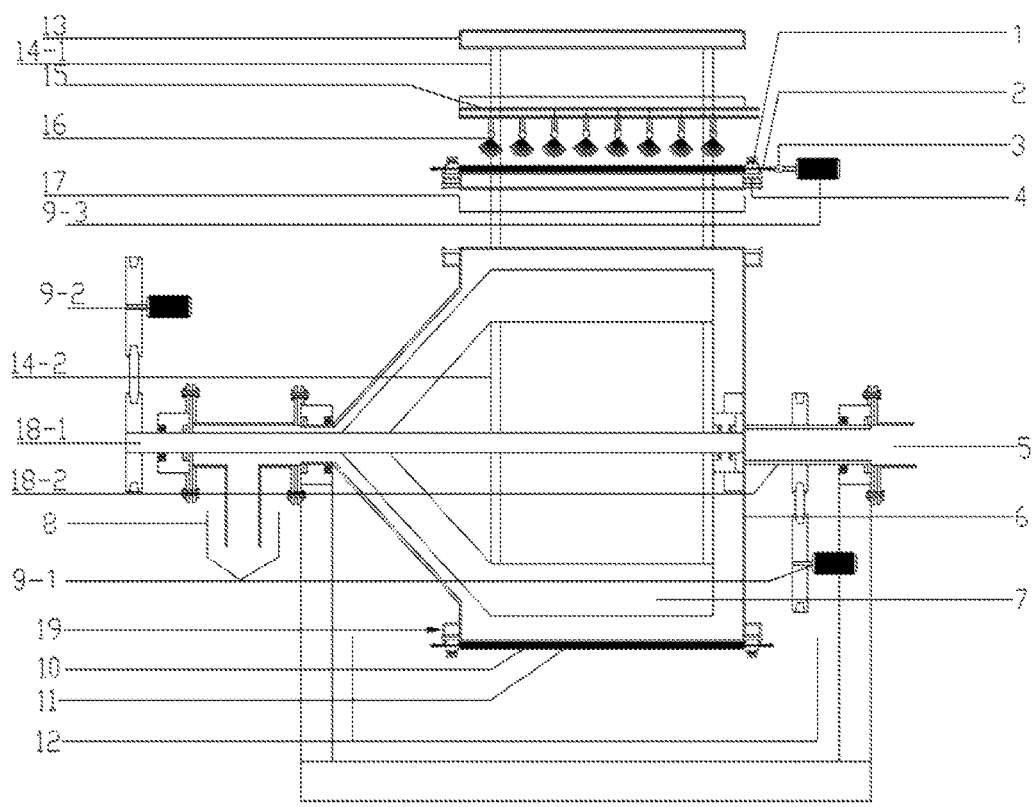
FIG. 1 is a cross-sectional view showing an entire configuration of a pore adjusting filtering apparatus for performing a filtering operation and a cleaning operation at the same time.
Figure 2:
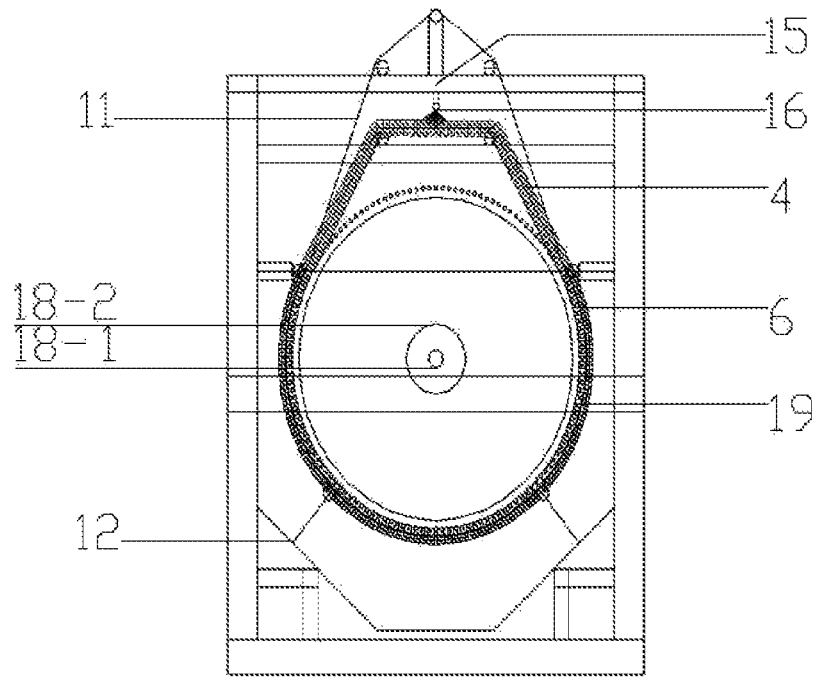
FIG. 2 is a side view showing the entire configuration of the pore adjusting filtering apparatus for performing a filtering operation and a cleaning operation at the same time.
Figure 3:
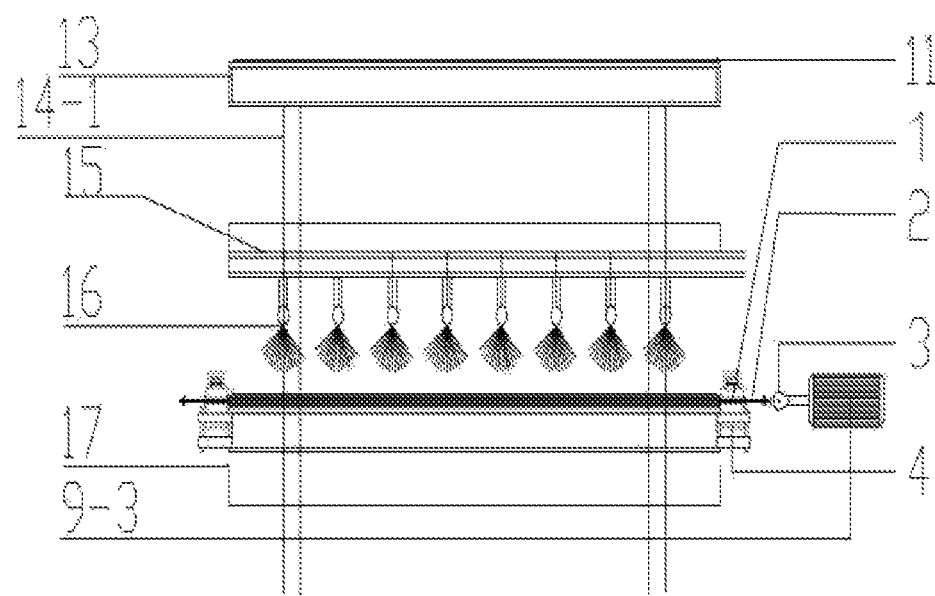
FIG. 3 is a front view showing a vibration type cleaning unit located at an upper portion of a cylinder.
Figure 4:
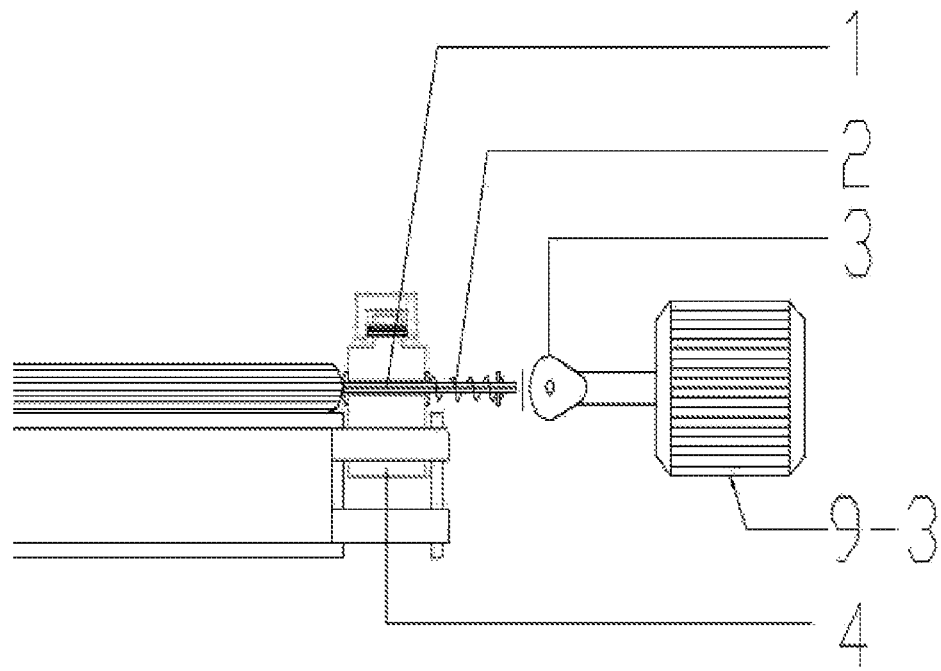
FIG. 4 is a partial view showing a cam located at an upper portion of the cylinder.
Figure 5:
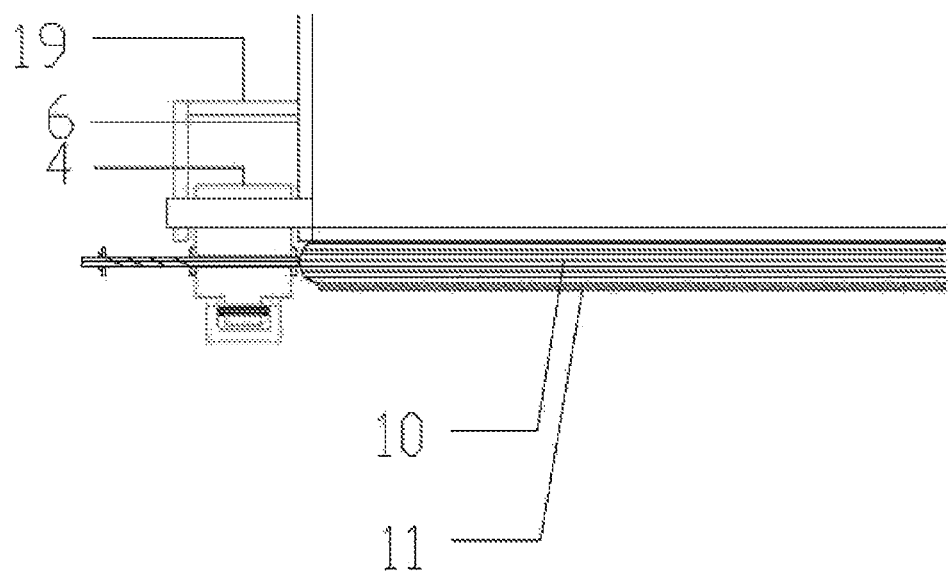
FIG. 5 is a partial view showing a fiber yarn bundle and a fiber yarn bundle support net located at a lower portion of the cylinder.

Hereinafter, a pore adjusting filtering apparatus according to an exemplary embodiment of the present invention will be described in detail with reference to FIGS. 1 to 5.

In the pore adjusting filtering apparatus according to the embodiment of the present invention, a cylinder 6 having a plurality of holes having a screw therein, an endless track 4 engaged with an outer surface of the cylinder 6 by an endless track pin and a support 19, and a fiber yarn bundle 10 engaged with the center hole of each of elements of the endless track are rotated at the same speed as that of the cylinder by a cylinder motor 9-1 connected to the cylinder and a rotary shaft 18-2 of the endless track. The screw in the cylinder is rotated at a speed higher than that of the cylinder by a screw motor 9-2 to feed sludge in wasted water and discharge the sludge into a sludge storage container 8. Small floating materials in the wasted water pass through the holes of the cylinder, are filtered by a fiber yarn bundle surrounding the cylinder, and are discharged into a filtering water tank 12. When the fiber yarn bundle is located at an upper portion of the cylinder while being rotated, the filtered floating materials are shaken down by a spring and a cam and is cleaned by a small amount of water. The shaken floating materials and the contaminated washing water are discharged into a cleaning water tank.

If water containing particle materials is introduced through a cylinder inlet 5, sludge in the water and floating materials (mainly, sludge having a high specific gravity) is fed in a rotation direction of the screw by the screw 7 formed in an interior of the cylinder 6 and is discharged into a sludge storing container 8 and the floating materials (mainly, floating materials having a low specific gravity) in the water is filtered by a fiber yarn bundle 10 supported by the fiber yarn bundle support net 11 and is discharged into a treatment water tank 12. The fiber yarn bundle 10 rotated at the same speed as that of the cylinder 6 performs a filtering operation when being located at a lower portion of the cylinder and performs a cleaning operation when being located at an upper portion of the cylinder. The endless track 4, the fiber yarn bundle 10, and the fiber yarn bundle support net 11 are suspended on a fiber yarn bundle support net cleaning separator 13 formed at an upper portion of the cylinder 6 while being rotated, a pore is expanded as the spring 2 and the cam 3 located at one side of the endless track are rotated, particle materials suspended on the fiber yarn bundle 10 are shaken down by vibrations, and the fiber yarn bundle 10 is cleaned by washing water ejected from the ejector located at a lower portion of an ejection unit.

The pore adjusting filtering apparatus for performing a filtering operation and a cleaning operation at the same time according to the present invention performs a filtering operation at a lower portion of the cylinder while the cylinder into which water is introduced and a fiber yarn bundle supported by the fiber yarn bundle support net are rotated and performs a cleaning operation at an upper portion of the cylinder while being vibrated by the cam 3, the cam motor 9-3, and the ejector 16.

After being introduced into the cylinder inlet 5, wasted water is withdrawn from the cylinder having holes, is filtered through the fiber yarn bundle 10 supported by the fiber yarn bundle support net 11, and is discharged the filtering water tank 12 at a lower portion of the cylinder. The screw 7 is rotated in the interior of the cylinder such that the filtered materials are fed to the storage container and are discharged into the sludge storage container 8.

Hereinafter, the configurations of the pore adjusting filtering apparatus according to the present invention and functions thereof will be described in more detail.

Reference numeral 1 denotes a fiber yarn bundle support rod inserted into a hole of an endless track 4, for supporting a fiber yarn bundle, in which a spring 2 is wound on an outer peripheral surface of the fiber yarn bundle support rod 1 and a cam 3 is connected to the fiber yarn bundle support rod 1.

Reference numeral 2 denotes a spring wound on an outer peripheral surface of the fiber yarn bundle support rod 1, for providing resiliency such that the fiber bundle support rod and the fiber yarn bundle reciprocate due to rotation of the cam.

Reference numeral 3 denotes a cam connected to the fiber yarn bundle support rod 1 and the spring 2, for repeatedly contracting and expanding the spring while being rotated by a motor and shaking down foreign substances stuck to a fiber yarn by tightening or loosening the fiber bundle.

Reference numeral 4 denotes an endless track which includes a plurality of endless track elements, in which each of the endless track elements has three holes such that the left and right holes are engaged with the left and right endless track elements and the central hole is engaged with the fiber yarn bundle support rod 1. The endless track includes a plurality of endless track elements for rotating the fiber yarn bundle while being rotated at the same speed as that of a cylinder.

Reference numeral 5 denotes an inlet of a cylinder connected to a horizontal rotary shaft of the cylinder and in which wasted water containing particle substances are introduced.

Reference numeral 6 denotes a cylinder fitted with the endless track 4 coupled by a pin and a support 19 and the fiber yarn bundle support rod 1 and having a plurality of holes on an outer peripheral surface thereof such that the fiber yarn bundle 10 engaged with the central hole of each of the elements of the endless track is rotated at the same speed as that of the endless track 4 by a cylindrical motor 9-1 connected to the cylinder and a rotary shaft 18-2 of the endless track and water introduced through an inlet is sent to the fiber yarn bundle surrounding an outer peripheral surface of the cylinder.

Reference numeral 7 denotes a hollow screw located in an interior of the cylinder 6 and configured to be rotated at a speed higher than that of the cylinder by a screw motor 9-2, for feeding particle substances and sludge in the water.

Reference numeral 8 denotes a sludge storage container storing sludge fed by the screw 7 and formed at a lower portion of one side of the cylinder in a forward direction of the wasted water.

Reference numeral 9-1 denotes a cylinder motor which is a power source connected to the cylinder and a horizontal rotary shaft 18-2 of the endless track and located on one side surface of the cylinder, for rotating the cylinder and the endless track at the same speed.

Reference numeral 9-2 denotes a screw motor which is a screw power source for rotating the screw 7 at a speed higher than that of the cylinder 6.

Reference numeral 9-3 denotes a cam motor which is power source connected to the cam 3 and located on a side surface of the cam 3, for rotating the cam 3 when the fiber yarn bundle 10 vibrates to be cleaned.

Reference numeral 10 denotes a fiber yarn bundle fitted with the endless track 4 engaged with an outer peripheral surface of the cylinder 6 by an endless track pin and a support 19 and the fiber bundle support rod 1 to be rotated at the same speed of that of the cylinder by the cylinder motor 9-1 engaged with the central hole of each of the elements of the endless track 4 and connected to the cylinder and the endless track rotary shaft 18-2 such that a filtering operation is performed by minutely adjusting a pore of the fiber yarn bundle by the fiber yarn bundle support net 11 attached and fastened to the cylinder when the fiber yarn bundle is located at a lower portion of the cylinder and a cleaning operation is performed by applying vibrations by the spring 2, the cam 3, and the ejection unit 15 and shaking down contaminants with washing water ejected from an ejector 16 while the pore of the fiber yarn bundle is expanded when the fiber yarn bundle is located at an upper portion of the cylinder.

Reference numeral 11 denotes a fiber yarn bundle support net located on an outer peripheral surface of the fiber yarn bundle 10, for minutely adjusting a pore of the fiber yarn bundle by attaching the fiber yarn bundle to the cylinder when the fiber yarn bundle is located at a lower portion of the cylinder and securing a pore while being positioned on a cleaning separator 13 and being separated from the fiber yarn bundle when the fiber yarn bundle is located at an upper portion of the cylinder.

Reference numeral 12 is a filtering water tank located at a lower portion of the cylinder, for storing water filtered through a lower fiber yarn bundle.

Reference numeral 13 is a cleaning separator fixedly located at an upper portion of a cleaning support 14-1 with respect to the cylinder, for supporting the fiber yarn bundle while the fiber yarn bundle support net 11 rotated during a cleaning operation spaces the fiber yarn bundle apart.

Reference numeral 14-1 denotes a cleaning support for vertically supporting the fiber yarn bundle support net cleaning separator 12 and an ejection unit 15.

Reference numeral 14-2 denotes a screw support for supporting an empty interior space of the screw 7.

Reference numeral 15 denotes an ejection unit supported by the cleaning support 14-1, for cleaning the fiber yarn bundle 10.

Reference numeral 16 is an ejector located at a lower portion of the ejection unit 15, for ejecting cleaning water when the fiber yarn bundle is cleaned.

Reference numeral 17 is a cleaning water tank for receiving contaminant washing water dropping the fiber yarn bundle after the clean water ejected from the ejector 16 is ejected to the fiber yarn bundle.

Reference numeral 18-1 denotes a horizontal screw rotary shaft connected to the screw motor 9-2, for rotating the screw 7 upwards and downwards.

Reference numeral 18-2 denotes a horizontal rotary shaft of the cylinder and the endless track for rotating the fiber yarn bundle 1—connected to the cylinder 6 and the endless track 4 at the same speed.

Reference numeral 19 denotes an endless track pin and a support for engaging the cylinder 6 and the endless track and supporting the endless track such that the endless track does not deviate an path of thereof.

Couplings and functions of the elements of the apparatus according to the present invention will be described below.

The endless track 4 formed on an outer peripheral surface of the cylinder 6 is engaged with the cylinder 6 and the endless track pin by the support 19 and the fiber yarn bundle 10 is fitted with the fiber yarn bundle support rod 1 and engaged with the central hole of each of the elements of the endless track such that the endless track, the cylinder, and the fiber yarn bundle are rotated at the same speed by the cylinder motor 9-1. Three holes are present in each of the elements of the endless track 4 formed on an outer peripheral surface of the cylinder 6, and the central hole is engaged with the fiber yarn bundle support rod 1 on which the fiber yarn bundle 10 is suspended.

When the fiber yarn bundle 10 rotated together with the cylinder 6 and the endless track 4 by the cylinder motor 9-1 is located at a lower portion of the cylinder, a filtering operation is performed, and its mechanism is as follows. If the water containing particle substances is introduced through the cylinder inlet 5, the screw 7 is rotated by the screw motor 9-2 formed in an interior of the cylinder to feed sludge and discharge the sludge to the sludge storage container 8, and the wasted water introduced into the fiber yarn bundle located at a lower portion of the cylinder through the holes of the cylinder is filtered by the fiber yarn bundle having fine pores tightly surrounded by the fiber yarn bundle support net 11 and is discharged into a treatment water tank 12.

A vibration type cleaning principle of the pore adjusting filtering apparatus performing a filtering operation and a cleaning operation at the same time according to the present invention is as follows. When the fiber yarn bundle 10 rotated together with the endless track 4 reaches an upper portion of the cylinder 6, the fiber yarn bundle support net 11 is suspended on the fiber yarn bundle support net cleaning separator 13 such that a pore of the fiber yarn bundle 10 is expanded, and the cam 3 pushes and pulls the fiber yarn bundle support rod 1 to apply vibrations to the fiber yarn bundle while the cam 3 is rotated by the cam motor 9-3 formed on one side surface of the fiber yarn bundle support rod 1 on which the spring 2 is wound such that washing water ejected from the ejector 16 located at a lower portion of the ejection unit 15 shakes down contaminants to perform a cleaning operation.

The entire functions of the apparatus according to the present invention will be summarized as follows in relation to the configurations and couplings of the apparatus. The present invention is a pore adjusting filtering apparatus for performing a filtering operation and a cleaning operation by a rotating fiber yarn bundle, in which the endless track 4 engaged with an outer peripheral surface of the cylinder 6 having the screw 7 therein by the endless track pin and the support 19 and the fiber yarn bundle 10 fitted with the fiber yarn bundle support rod 1 and engaged with the central hole of each of the elements of the endless track are rotated at the same speed together with the cylinder by the cylinder motor 9-1 connected to the cylinder and the endless track rotary shaft 18-2 such that a filtering operation is performed at a lower portion of the cylinder by minutely adjusting a pore of the fiber yarn bundle by the fiber yarn bundle support net 11 attached and tightly fastened to the cylinder and a cleaning operation is performed at an upper portion of the cylinder by applying vibrations to the fiber yarn bundle while expanding a pore of the fiber yarn bundle by the spring 2, the vibration unit 3, and the ejection unit 15 to shake down contaminants with washing water ejected from the ejector 16.

The effects of the pore adjusting filtering apparatus performing a filtering operation and a cleaning operation at the same time according to the present invention are as follows.

First, since a pore of the filtering apparatus according to the related art is blocked over time, it is difficult to perform a backwashing operation and a filtering operation is stopped even while a backwashing operation is performed. The pore adjusting filtering apparatus performing a filtering operation and a cleaning operation according to the present invention performs a filtering operation and a cleaning operation at lower and upper portions of a cylinder by the cylinder, an endless track, and a fiber yarn bundle which are rotated at the same time, so that a filtering operation can be continued even during a cleaning operation to filter a constant amount of water.

Second, the filtering apparatus according to the related art corresponds to a fixed pore in which a pore is not adjusted during a filtering operation and a backwashing operation. The apparatus according to the present invention is a pore adjusting filtering apparatus for minutely adjusting pores of a plurality of fiber yarn bundles by attaching a fiber yarn bundle support net to a cylinder during a filtering operation and positioning the fiber yarn bundle support bundle on a cleaning separator to separate the fiber bundle support net from the fiber yarn bundle and expand pores during a cleaning operation.

Third, the filtering apparatus according to the related art frequently undergoes a backwashing operation to significantly improve an amount of cleaned water and an amount of washed water when particle substances or sludge are present in water or water is turbid and abundant in algae. The apparatus according to the present invention can apply vibrations to a fiber yarn bundle as a cam rotates to perform a cleaning operation with a small amount of washing water while shaking down particle substances so that an amount of cleaned water is small and cleaning efficiency is high.

The apparatus according to the present invention minutely adjusts a pore by attaching a fiber yarn bundle support net to a cylinder during a filtering operation and positions the fiber yarn bundle support net on a cleaning separator to expand a pore and vibrating the fiber yarn bundle support net during a cleaning operation, increasing cleaning efficiency.

What is claimed is:

1. A pore adjusting filtering apparatus comprising:
   a cylinder having an inlet and a plurality of holes and in which a screw is rotatably installed to transfer suspended solids in wastewater;
   an endless track coupled to an outer peripheral surface of the cylinder by an endless track pin and support;
   a fiber yarn bundle support rod inserted into a middle hole of the endless track to be connected to the endless track;
   a fiber yarn bundle, one end of which is fitted with and supported by the fiber yarn bundle support rod,
   wherein the fiber yarn bundle surrounding the cylinder is rotated by a cylinder motor which is connected to horizontal axis of the cylinder;
   a fiber yarn bundle support net supporting the fiber yarn bundle while being attached to an outer peripheral surface of the fiber yarn bundle,
   wherein the closed fiber yarn bundle support net and fiber yarn bundle adjusts a pore of the fiber yarn bundle so that the contaminants are filtered through the plurality of holes of the cylinder when the fiber yarn bundle is located at a lower portion of the cylinder;
   a cleaning support connecting a cleaning separator and the cylinder, the cleaning separator supporting the fiber yarn bundle support net when the fiber yarn bundle support net is separated from the fiber yarn bundle;
   an ejector located between the cleaning separator and the cylinder, the ejector cleaning the contaminants by ejecting water to the fiber yarn bundle when the fiber yarn bundle and the fiber yarn bundle support net are separated from each other so that the fiber yarn bundle is located at an upper portion of the cylinder; and
   a vibration unit horizontally vibrating the fiber yarn bundle while the ejector ejects water to the fiber yarn bundle,
   wherein the fiber yarn bundle and the fiber yarn bundle support net are separated when the fiber yarn bundle is rotated to reach the cleaning separator.

2. The pore adjusting filtering apparatus of claim 1, wherein the vibration unit comprises:
   a spring fitted with the fiber yarn bundle support rod, wherein the spring resiliently supports the fiber yarn bundle support rod with respect to the endless track; and
   a cam connected to a cam motor, wherein the cam laterally pushes and pulls the fiber yarn bundle support rod to vibrate the fiber yarn bundle,
   wherein the cam is operated by the cam motor.

* * * * *